(12) United States Patent
Shih (10) Patent No.: US 8,075,344 B2
(45) Date of Patent: Dec. 13, 2011

(54) DOUBLE HOOKED REVERSE MOUNTABLE MODULE AND PANEL WITH OPENING FOR MULTIPLE MODULES MOUNTING

(75) Inventor: Yi-Teh Shih, Richardson, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 22 days.

(21) Appl. No.: 12/715,828

(22) Filed: Mar. 2, 2010

(65) Prior Publication Data

US 2010/0227500 A1  Sep. 9, 2010

Related U.S. Application Data

(60) Provisional application No. 61/157,047, filed on Mar. 3, 2009.

(51) Int. Cl.
*H01R 25/16* (2006.01)

(52) U.S. Cl. ..................................................... 439/649

(58) Field of Classification Search .................. 439/649, 439/634, 540.1, 557, 553, 465, 713; 361/822; 385/822
See application file for complete search history.

(56) References Cited

U.S. PATENT DOCUMENTS

| | | | |
|---|---|---|---|
| 3,573,716 A * | 4/1971 | Garver | 439/557 |
| 3,989,343 A * | 11/1976 | Lucius et al. | 439/557 |
| 4,687,291 A | 8/1987 | Stape et al. | |
| 5,401,193 A * | 3/1995 | Lo Cicero et al. | 439/713 |
| 7,278,880 B1 | 10/2007 | Wu | |
| 7,488,205 B2 | 2/2009 | Spisany et al. | |
| 2004/0014367 A1 | 1/2004 | Petersen | |
| 2006/0025010 A1 * | 2/2006 | Spitaels et al. | 439/532 |
| 2007/0149045 A1 * | 6/2007 | Caveney et al. | 439/540.1 |
| 2008/0090461 A1 | 4/2008 | Pepe et al. | |

FOREIGN PATENT DOCUMENTS

| | | |
|---|---|---|
| EP | 0 147 828 | 7/1985 |
| EP | 1 324 432 | 7/2003 |
| WO | 2006/091850 | 8/2006 |

* cited by examiner

*Primary Examiner* — Alexander Gilman
(74) *Attorney, Agent, or Firm* — Muncy, Geissler, Olds & Lowe, PLLC (57) ABSTRACT

A patch panel system includes a patch panel frame having an opening formed therein for receiving a multi-port module. The opening is dimensioned to have a width of at least twice the width of the module. The module or patch panel frame includes at least one movable member, such as a resilient tab, which is used to removably attach the module within the opening in one of two orientations. In a first orientation, the ports of the module face a user, such that the ports can be easily populated. In a second orientation, the module is rotated one hundred eighty degrees about a vertical axis prior to being attached within the opening, such that the backs of the ports face the user to help facilitate population of connections to the backs of the ports.

17 Claims, 7 Drawing Sheets

DOUBLE HOOKED REVERSE MOUNTABLE MODULE AND PANEL WITH OPENING FOR MULTIPLE MODULES MOUNTING

This application claims the benefit of U.S. Provisional Application No. 61/157,047, filed Mar. 3, 2009, the entire contents of which are herein incorporated by reference.

BACKGROUND OF THE INVENTION

1. Field of the Invention

The present invention relates to patch panels. More particularly, the present invention relates to a patch panel and multi-port module, wherein the patch panel includes an opening size larger in width than the module and the module can be snapped into the opening to face forwards or rearwards, which greatly facilitates the population of the punch down terminals on the rear of the module.

2. Description of the Related Art

To add a wire to punch down terminals on the rear of a multi-port module in the background art, the technician removes the module from the patch panel and pulls the module away from the patch panel several inches (e.g., 6 to 14 inches depending upon the slack available from the wires already populating the terminals on the rear of the module). The technician can hold the module in one hand or have an assistant hold the module while the new wire is punched onto the terminal on the rear of the module. Alternatively, the module can be rested face down on a wiring trough in front of the patch panel and the new wire or wires can then be punched onto the terminal(s) on the rear of the module.

SUMMARY OF THE INVENTION

The Applicant has appreciated drawbacks with the patch panels and modules of the background art.

In the first instance of the background art procedure, it is extremely difficult to punch down a wire onto the terminals on the rear of the module using only one hand. In the second instance of the background art procedure, a second person is needed to complete the punch down task, which adds to the service costs. In the third instance of the background art procedure, the wiring trough must be built in a robust manner to handle the forces applied to the module during the punch down operation, which can require up to 50 pounds of force or thrust. The robust tray is expensive to manufacture and bulky in its appearance and attachment to the patch panel and/or supporting frame of the patch panel.

Therefore, the Applicant has appreciated a need in the art for a new patch panel and/or a new module to address one or more of the drawbacks.

These and other objects are accomplished by a patch panel system including a patch panel frame having an opening formed therein for receiving a multi-port module. The opening is dimensioned to have a width of at least twice the width of the module. The module or patch panel frame includes at least one movable member, such as a resilient tab, which is used to removably attach the module within the opening in one of two orientations. In a first orientation, the ports of the module face a user, such that the ports can be easily populated. In a second orientation, the module is rotated one hundred eighty degrees about a vertical axis prior to being attached within the opening, such that the backs of the ports face the user to help facilitate population of connections to the backs of the ports.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings; in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 1:
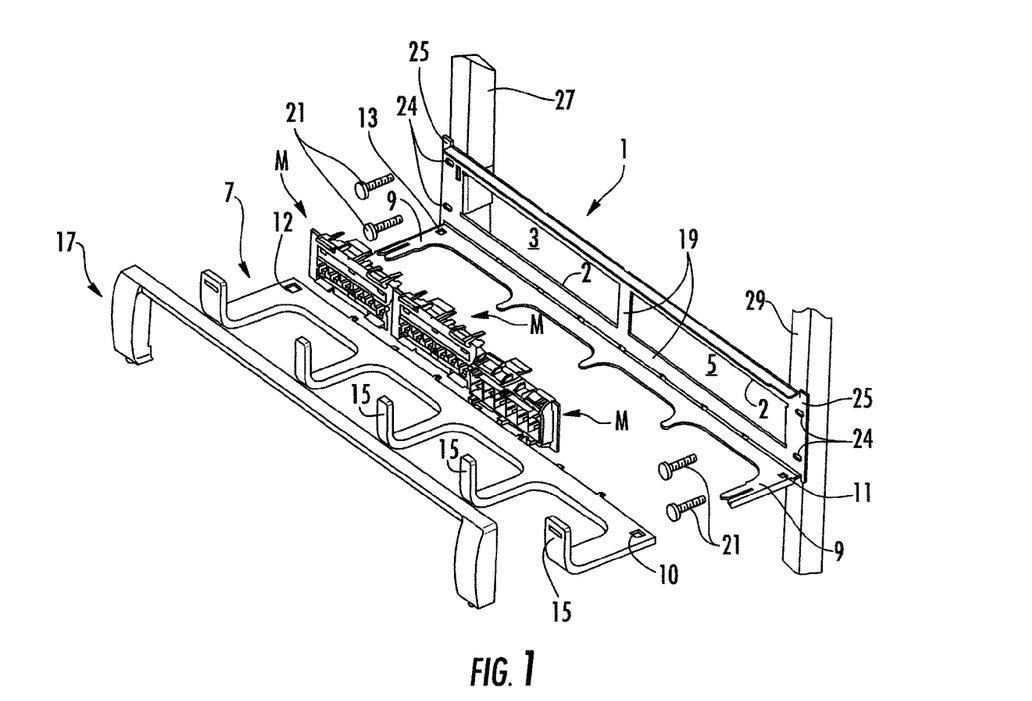
FIG. 1 is an exploded, perspective view of a patch panel system, in accordance with one embodiment of the present invention.

FIG. 1 is an exploded view of one embodiment of the present invention where a patch panel frame 1 includes a first opening 3 and a second opening 5. Each of the first opening 3 and the second opening 5 has an extended width, such as about twice the width of a normal opening in a typical patch panel frame (e.g., approximately twice the width of a module M to be inserted into the opening, as will be more fully described hereinafter).

Figure 7:
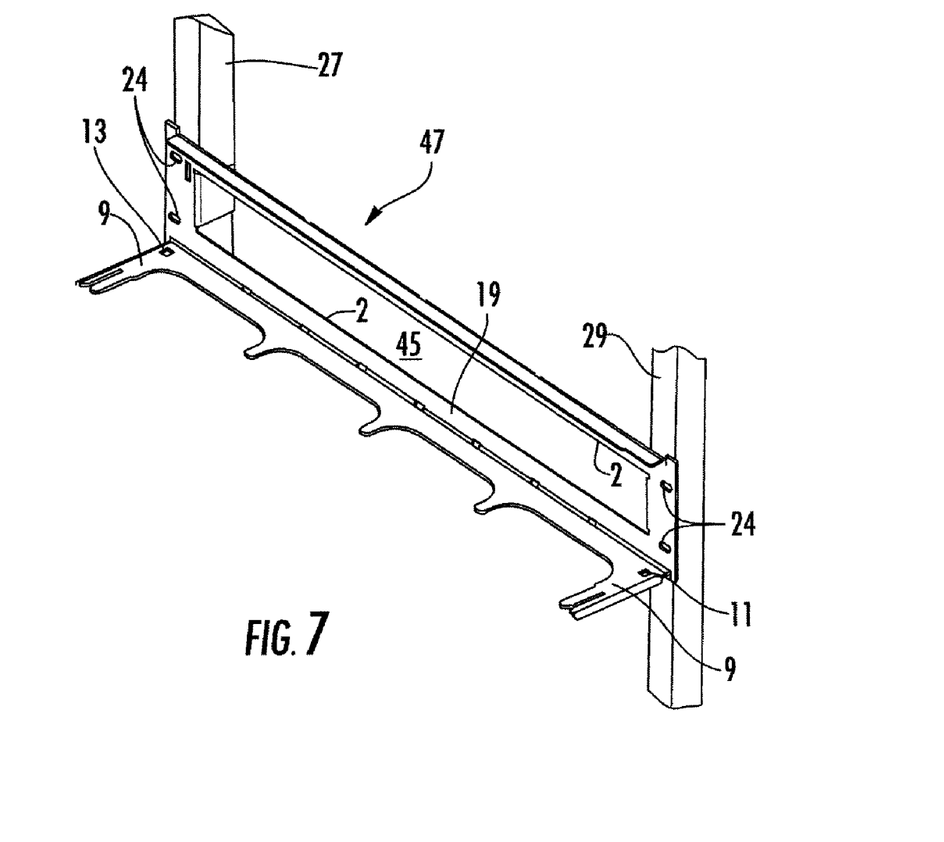
FIG. 7 is a perspective view of a modified patch panel frame according to the first embodiment of the present invention.

A typical patch panel frame is about nineteen inches in width and about 1.75 inches in height, in the case of a 1 U frame, or 3.5 inches in height, in the case of a 2 U frame. The typical patch panel frame has four openings. A same-sized 1 U or 2 U patch panel frame, in accordance with this present embodiment, has two openings (each being twice the normal opening width). In accordance with a modified embodiment to be later described, the patch panel frame 1 could have a single opening (approximately four times the normal opening width of a typical patch panel frame, as illustrated in FIG. 7).

A wiring trough 7 is slid over mounting tabs 9 on the patch panel frame 1. The wiring trough 7 can be formed of plastic. The wiring trough 7 may include first and second cutouts 10 and 12, which snap over first and second mounting studs 11 and 13 of the patch panel frame 1 to secure the wiring trough 7 to the patch panel frame 1. The wiring trough 7 has a plurality of upturned fingers 15 (e.g., five upturned fingers are illustrated in FIG. 1).

The wiring trough 7 of the present invention need not be fabricated as robustly as the wiring troughs of the background art, where the wiring trough needed to support the front face of a module during a punch down operation, where the ensuing forces applied using a punch down tool can reach fifty pounds of thrust. Hence, the wiring trough 7 of the present invention can be manufactured for less cost and can have a more pleasing and open appearance.

A bezel 17 can be attached to a front face 19 of the patch panel frame 1. The bezel 17 may be formed of plastic and snapped onto the front face 19 of the patch panel frame 1. The bezel 17 cleans up the appearance of the patch panel frame 1 and covers mounting devices. The mounting devices may include fasteners 21, such as screws or bolts, which pass through mounting holes 24 in the side flanges 25 of the patch panel frame 1 to attach the patch panel frame 1 to first and second rack rails 27 and 29.

Figure 2:
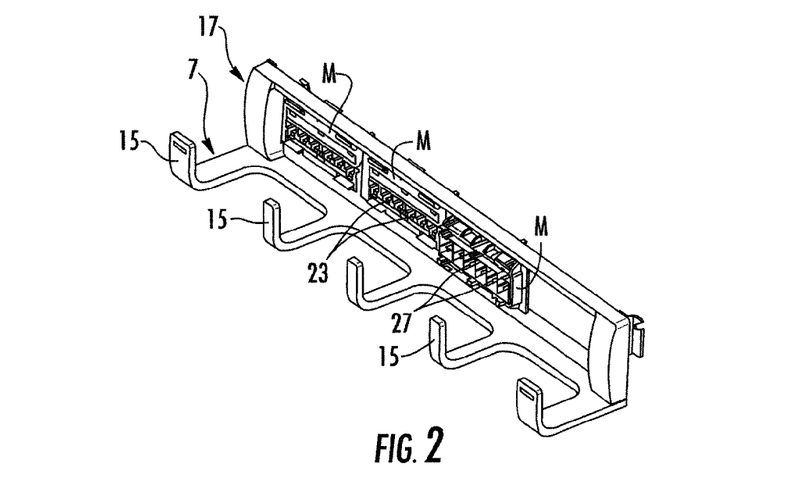
FIG. 2 is a perspective view illustrating the component parts of FIG. 1 in an assembled state.

FIG. 2 illustrates the component parts of FIG. 1 in an assembled state. In the assembled state, the wiring trough 7 is snapped onto the first and second mounting studs 11 and 13 of the patch panel frame 1, and the bezel 17 is attached to the front face 19 of the patch panel frame 1.

Figure 3:
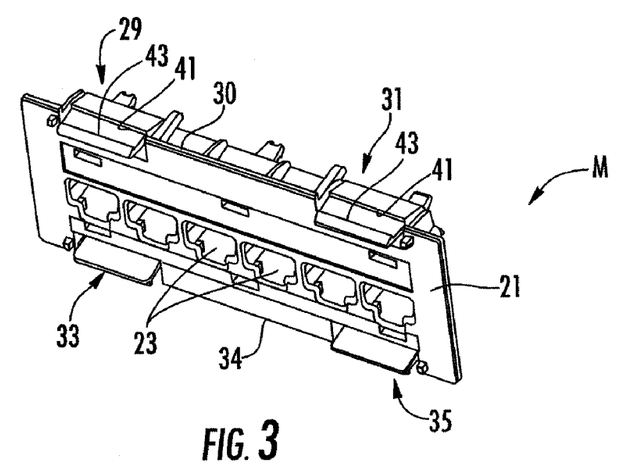
FIG. 3 is a perspective view of a module in FIG. 1.
Figure 4:
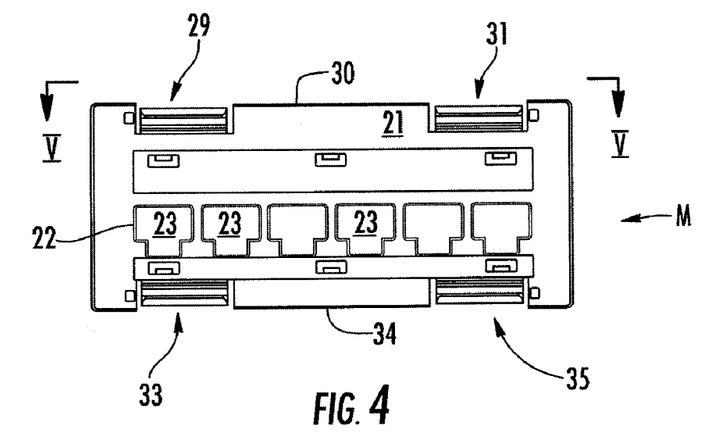
FIG. 4 is a front view of the module in FIG. 3.
Figure 5:
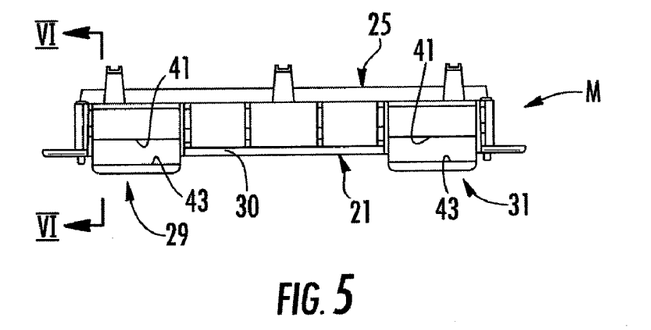
FIG. 5 is a top view of the module in FIG. 4, taken from the perspective of line V-V in FIG. 4.

Modules M are best illustrated in FIGS. 3-5, where FIG. 3 is a perspective view of a module M, FIG. 4 is a front view of the module M, and FIG. 5 is a top view, taken from line V-V in FIG. 4.

The modules M are structured to snap into the first or second openings 3 or 5. A front or first face 21 of the module M includes a plurality of port receptacles 22 for holding a plurality of ports 23. In FIGS. 3-5, each module M has six ports 23 in a single row to receive RJ-style plugs. However, the number of ports 23 and number of rows may be more or fewer in accordance with the present invention, such as five ports, ten ports or twelve ports, as will be illustrated in further embodiments. The ports 23 may be removably mounted within the port receptacles 22.

Although RJ-style ports are illustrated, other types of ports 23 could be employed in the present invention, such as fiber ports. Also, although the ports 23 are illustrated as opening in a direction which is substantially perpendicular to the first face 21 of the module M, the ports 23 may open at an angle to the first face 21 in order to send cordage toward the first and second rack rails 27 and 29. Removable ports, which are attached within port receptacles of a module at an angle, are fully described in the Assignee's prior U.S. Pat. No. 7,488, 205 granted Feb. 10, 2009, which is incorporated herein by reference.

A rear or second face 25 of each module M includes a plurality of insulation displacement contacts 27, sometimes abbreviated as IDCs 27 and often referred to as punch down connectors. In FIGS. 1-2, the ports 23 are facing to the front of the patch panel frame 1 in the left two modules M, and the IDCs 27 are facing to the front of the patch panel frame 1 in the rightmost module M.

Each port 23 will have a plurality of IDCs 27 on its backside (See FIG. 2). For example, in the case of RJ-type ports, there could be four IDCs 27 per port 23, six IDCs 27 per port 23, or eight IDCs 27 per port 23, etc. The number of IDCs 27 depends upon the number of spring jack wires employed within the port 23, i.e., which make electrical connection with contacts of a mating plug.

Typically, a punch down tool is used to punch down one or more wires from a cable into the IDCs 27. It may take up to 50 lbs of force or thrust to simultaneously punch down several wires using this punch down tool. Therefore, the module M needs to be well supported during the punch down operation.

Figure 6:
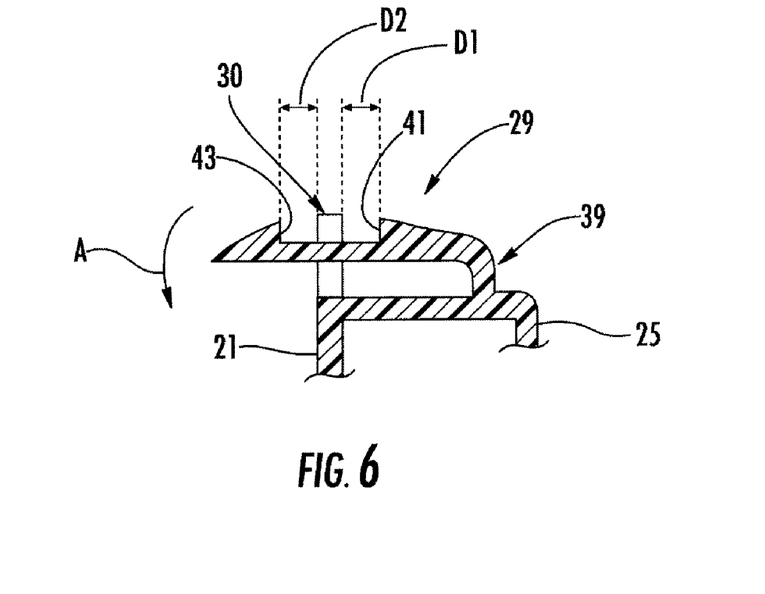
FIG. 6 is a cross sectional view taken along line VI-VI in FIG. 5.

In accordance with one embodiment of the present invention, the module M includes first and second resilient tabs 29 and 31 proximate an upper edge 30, and third and fourth resilient tabs 33 and 35 proximate a lower edge 34. Each tab 29, 31, 33 and 35 is connected to the module M by a living hinge 39 (best seen in the cross sectional view of FIG. 6), which permits deflection of the hinge 39 toward the module M in the direction of arrow A. Each tab 29, 31, 33 and 35 includes a first forward facing stop surface 41 and a second, rearward facing stop surface 43. From a side view perspective, the upper edge 30 of the first face 21 of the module M is positioned between the first and second stop surfaces 41 and 43. As shown in FIG. 6, a distance D1 between the rear of the first face 21 and the first stop surface 41 is equal to a distance D2 between a front of the first face 21 and the second stop surface 43. The distances D1 and D2 are each also about equal to, or slightly greater than, a thickness of the patch panel frame's perimeter edge 2 formed around the openings 3 and 5 of the patch panel frame 1.

The upper and lower tabs 29, 31, 33 and 35 permit the module M to be mounted into an opening 3 or 5 of the patch panel frame 1 to face forwards or rearwards at the user's discretion. The mounting is accomplished by snapping the module M into one of the openings 3 or 5. If the module M is to be forward facing (with the RJ ports 23 facing the user), the upper and lower perimeter edges 2 of the opening 3 or 5 are snap-captured between the first stop surface 41 and the rear of the first face 21 (i.e., in the space designated by the distance D1) for each tab 29, 31, 33 and 35. If the module M is to be rearward facing (with the IDCs 27 facing the user), the upper and lower perimeter edges 2 of the opening 3 or 5 are snap-captured between the second stop surface 43 and the front of the first face 21 (i.e., in the space designated by the distance D2) for each tab 29, 31, 33 and 35.

To release the module M from the opening of the patch panel frame 1, the user applies a downward pressure to the upper tabs 29 and 31 and an upward pressure to the lower tabs 33 and 35, which causes the tabs to move in the direction of arrow A in the FIG. 6, e.g., toward the module M. Once the first or second stop surfaces 41 or 43 are disengaged from the perimeter edge 2 of the opening 3 or 5, the module M will be free to be removed from the patch panel frame 1.

The ability to mount the module M with the ports 23 facing the user or the IDCs 27 facing the user has benefits. For example, if the patch panel frame 1 is not filled with modules M (e.g., three modules M are mounted into the openings 3 and 5, leaving an empty "module-size" space in opening 5, as illustrated in FIG. 2), a module M adjacent to the empty space in opening 5 can be snapped out of the patch panel frame 1 and pulled away from the patch panel frame 1 several inches (via the slack in the cables connected to the IDCs 27 on the rear side of the ports 23).

The module M can then be manually turned 180 degrees about a vertical axis by the user and snapped back into the middle of the opening 5. The wires connected to the IDCs 27 would pass along one lateral side of the module M and back into the opening 5 in the patch panel frame 1. Also the patch cords associated with plugs in the ports 23 of the turned module M would pass through the opening 5 in the patch panel frame 1 on the opposite lateral side of the module M to reach to the ports 23 of the module M (which now face rearwardly relative to the user and patch panel frame 1).

With the module M snapped into the patch panel frame 1 in the rearward facing orientation, a punch tool can be used to punch down wires on the IDCs 27. The patch panel frame 1 and the rack rails 27 and 29 to which it is connected are extremely sturdy and can certainly handle the applied forces during a punch down operation. Once all of the wires are punched down, the user may remove the module M from the patch panel frame 1 by pressure on the resilient upper and lower tabs 29, 31, 33 and 35. Then, the module M would be manually rotated 180 degrees about the vertical axis (in a direction opposite to the initial 180 degree rotation) and snapped back into the opening 5 in the patch panel frame 1 in the forward facing direction.

If the patch panel frame 1 does not have an empty space adjacent to the desired module M (e.g., four modules are snapped into the openings 3 and 5 of the patch panel frame 1), there are other methods of use. For example, if a nearby patch panel frame (e.g., mounted above or below the subject patch panel frame 1) has an empty space in an opening, then it would be possible to utilize the empty space in the opening of the adjacent patch panel frame by snapping a removed module M into the empty space in a rearward facing direction for a punch down operation.

As another example, in the same patch panel frame 1, an adjacent module M to the desired module M can be removed and pulled several inches from the patch panel frame. Then, the desired module M can be removed and pulled out several inches. Now, an empty space substantially equal to two modules would be created in the patch panel frame 1 (the empty space is slightly less due to the wires and cords connected to the initially removed module M extending out of the opening). These wires can be pushed to a lateral side of the empty space in the patch panel frame 1 to create an empty space sufficient in size to allow the desired module M to be rotated 180 degrees about a vertical axis and snapped back into the empty space for a punch down operation.

The modules M can be slid laterally inside of the openings 3 or 5 in the patch panel frame 1 without being removed, if another module M is not located beside the module M desired to be slid over. This is an advantageous feature which can open up a space in a needed location, such as immediately above or below a desired module M in an upper or lower adjacent patch panel frame 1. As illustrated in FIG. 7, the sliding feature is further enhanced if a single large opening 45 is provided in a modified patch panel frame 47, sufficient in size to hold four modules M. The modified patch panel frame 47 has a single large opening 45 (approximately four times the normal opening width of a typical patch panel frame). The sliding feature could also be of assistance to allow a short patch cord to reach a module, as the module M could be slid toward the direction of the incoming short patch cord.

Figure 8:
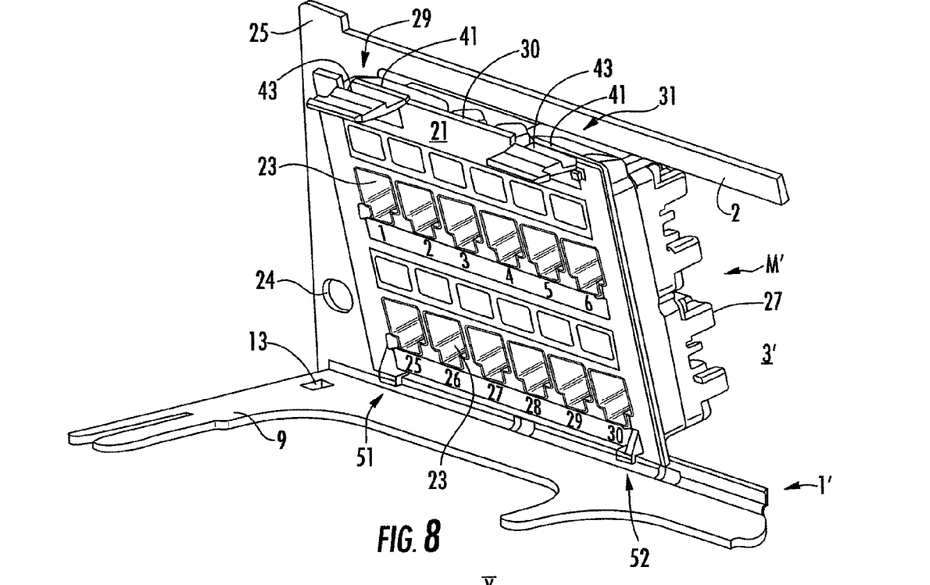
FIG. 8 is a perspective view of a patch panel system with a module in the process of being attached to a patch panel frame in a first orientation, in accordance with a second embodiment of the present invention.
Figure 9:
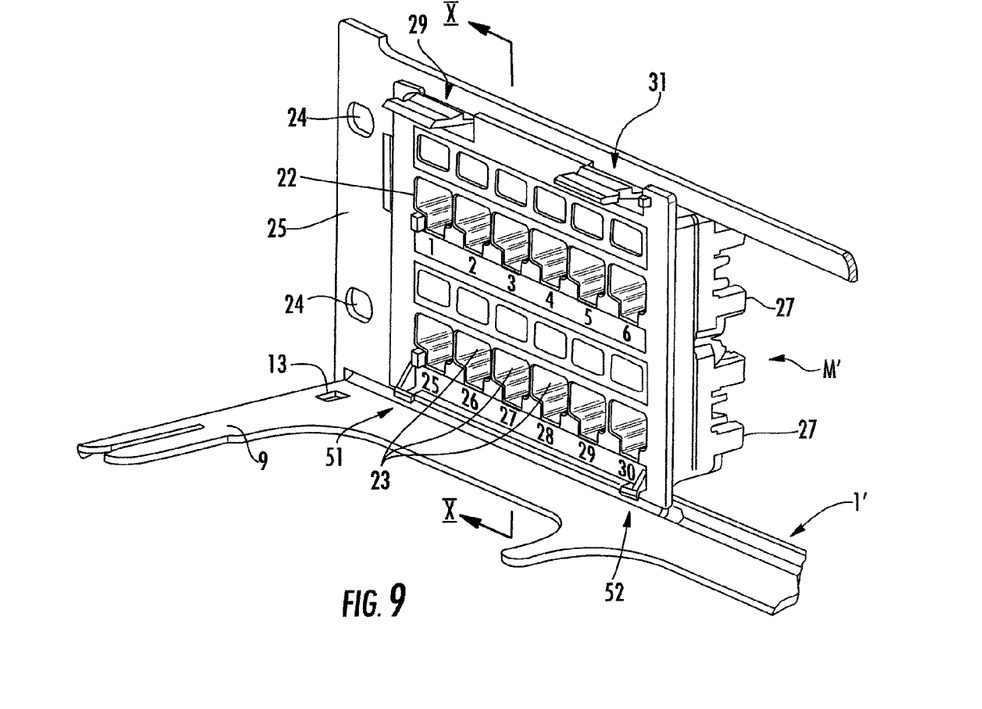
FIG. 9 is a perspective view of the patch panel system of FIG. 8 with the module attached to the patch panel frame in the first orientation.

FIG. 8 illustrates a second embodiment of the patch panel system, in accordance with the present invention. In the perspective view of FIG. 8, a modified module M' is in the process of being attached to a modified patch panel frame 1' in a first orientation. In FIG. 9, the modified module M' is attached to the modified patch panel frame 1' in the first orientation, and FIG. 10 a cross section view taken along line X-X in FIG. 9.

One difference between the modified module M' and the module M of FIGS. 1-5 is that the modified module M' has two rows of ports 23, each row having six ports 23. The modified module M' is dimensioned to fit into a modified opening 3' in the modified patch panel frame 1', which is about twice the height of the opening 3 in patch panel frame 1 of FIGS. 1 and 2. Such a modified patch panel frame 1' is considered to be a 2 U patch panel frame, and would have a height of approximately 3.5 inches and an overall width of approximately 19 inches.

Another difference between the modified module M' and the module M of FIGS. 1-5 is that the modified module M' does not have the lower resilient tabs 33 and 35 at its lower edge 34. The modified module M' has only the upper resilient tabs 29 and 31 at its upper edge 30. The upper resilient tabs 29 and 31 may be formed in an identical fashion to the first embodiment, as best seen in FIG. 6. The lower resilient tabs 33 and 35 on the lower edge 34 of the modified module M' have been replaced with first and second cups 51 and 52.

Figure 10:
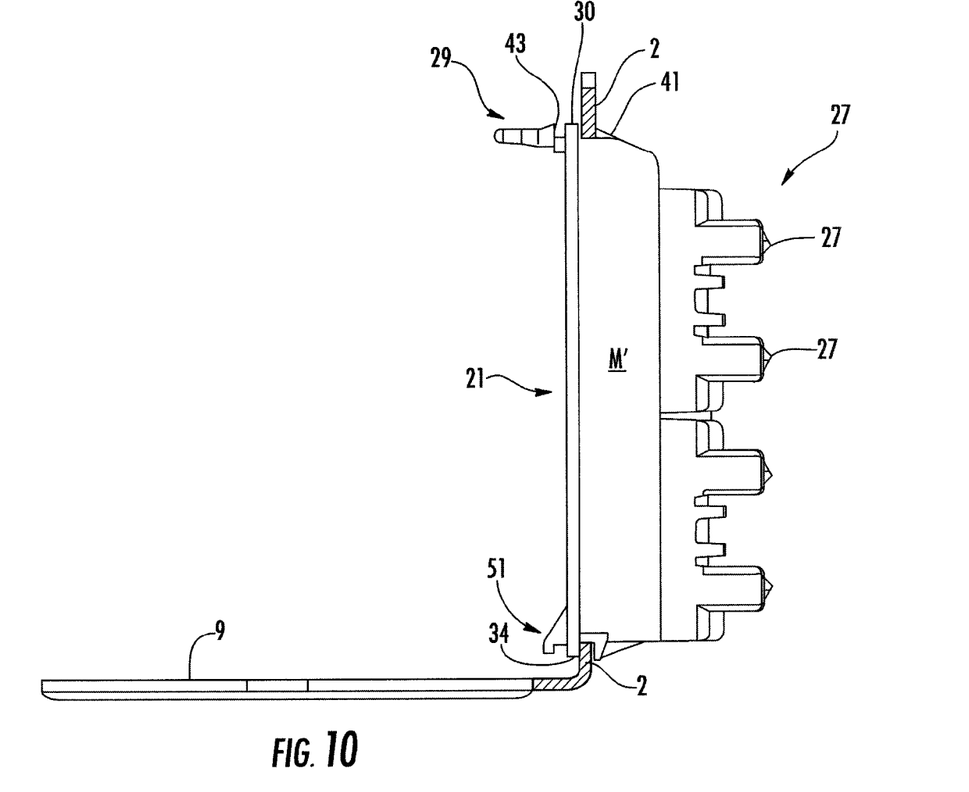
FIG. 10 is a cross sectional view taken along line X-X in FIG. 9.
Figure 10A:
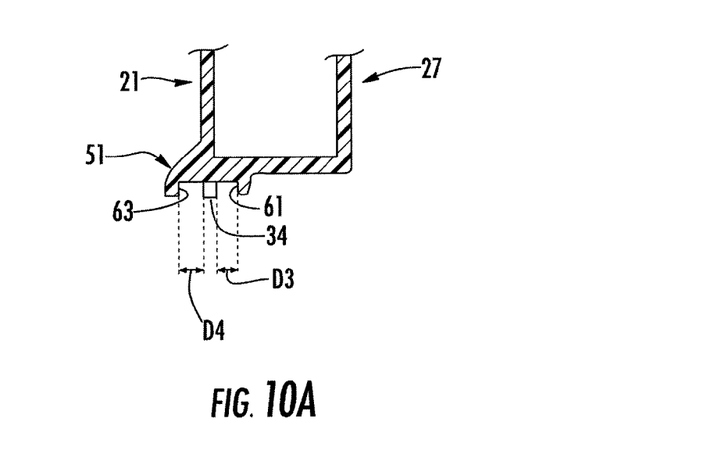
FIG. 10A is a close-up, cross section view of a first cup on a lower edge of the module of FIGS. 8-10.

FIG. 10A is close-up, cross sectional view of the first cup 51. The first and second cups 51 and 52 may be formed identically. Each cup 51 and 52 includes a first, forward facing stop surface 61 and a second, rearward facing stop surface 63. From a side view perspective, the lower edge 34 of the first face 21 of the modified module M' is positioned between the first and second stop surfaces 61 and 63. As shown in FIG. 10A, a distance D3 between the rear of the first face 21 and the first stop surface 61 is equal to a distance D4 between a front of the first face 21 and the second stop surface 63. The distances D3 and D4 are each also about equal to, or slightly greater than, a thickness of the patch panel frame's perimeter edge 2 formed around the openings 3 and 5 of the patch panel frame 1'.

The upper tabs 29 and 31 and lower cups 51 and 53 permit the modified module M' to be mounted into the openings 3 or 5 of the modified patch panel frame 1' to face forwards or rearwards at the user's discretion. The mounting is accomplished by seating the lower cups 51 and 53 on the perimeter edge 2 of the opening 3 and then by snapping the upper tabs 29 and 31 onto the perimeter edge 2 of the modified module M'. If the modified module M' is to be forward facing (with the RJ ports 23 facing the user), the lower cups 51 and 53 are seated upon the lower perimeter edge 2 of the opening 3, such that the lower perimeter edge 2 resides between the rear of the first face 21 and the first face 61 of the cups 51 and 53 (i.e., in the space designated by the distance D1). This arrangement is illustrated in FIG. 8.

Next, the modified module M' is pivoted toward the modified patch panel frame 1' until the upper perimeter edge 2 is snap-captured between the first stop surface 41 and the rear of the first face 21 (i.e., in the space designated by the distance D1) as each of the upper resilient tabs 29 and 31 pivots downwardly toward the modified module M' to snap past the perimeter edge 2. This arrangement is illustrated in FIGS. 9 and 10.

Figure 11:
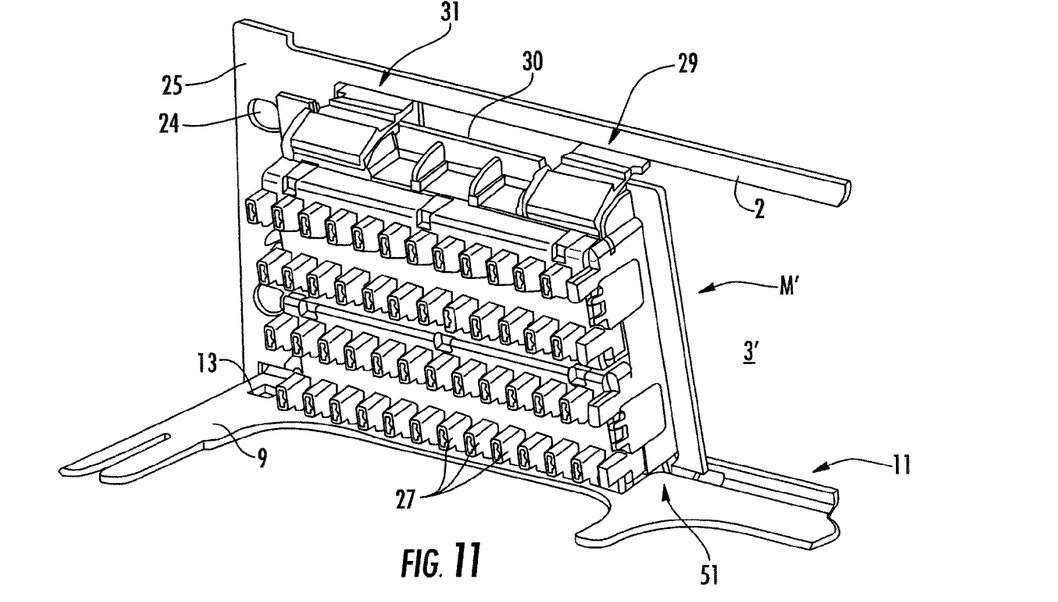
FIG. 11 a perspective view of the patch panel system of FIG. 8 with the module in the process of being attached to the patch panel frame in a second orientation.

If the module M is to be rearward facing (with the IDCs 27 facing the user), the lower cups 51 and 53 are seated upon the lower perimeter edge 2 of the opening 3, such that the lower perimeter edge 2 resides between the front of the first face 21 and the second face 63 (i.e., in the space designated by the distance D4). This arrangement is illustrated in FIG. 11.

Figure 12:
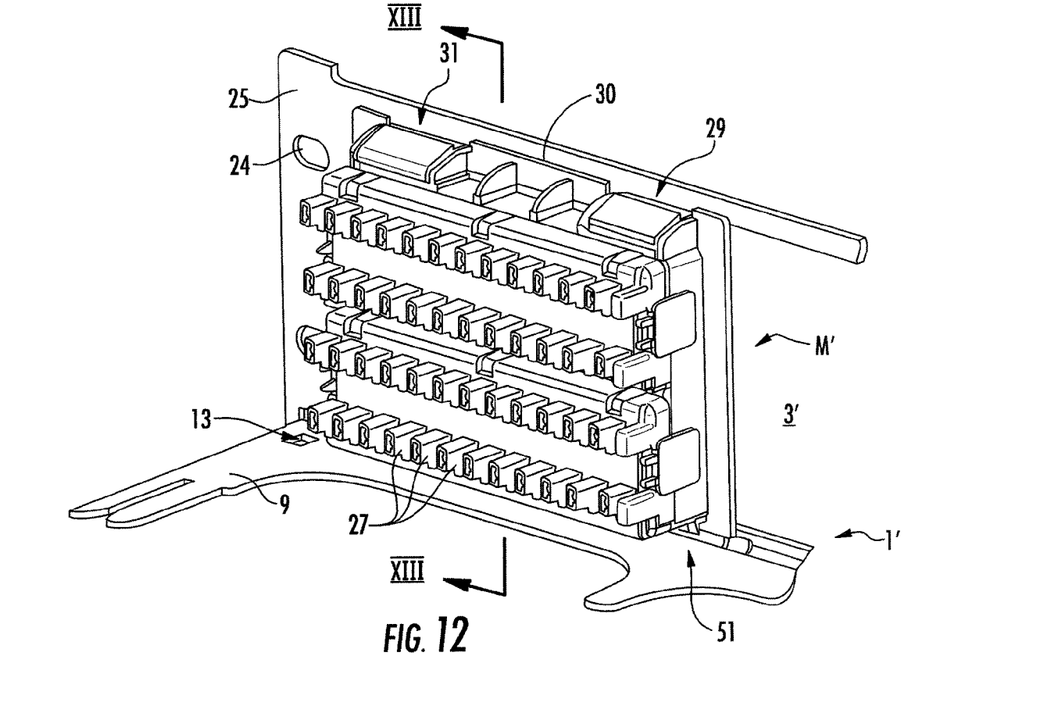
FIG. 12 is a perspective view of the patch panel system of FIG. 11 with the module attached to the patch panel frame in the second orientation.
Figure 13:
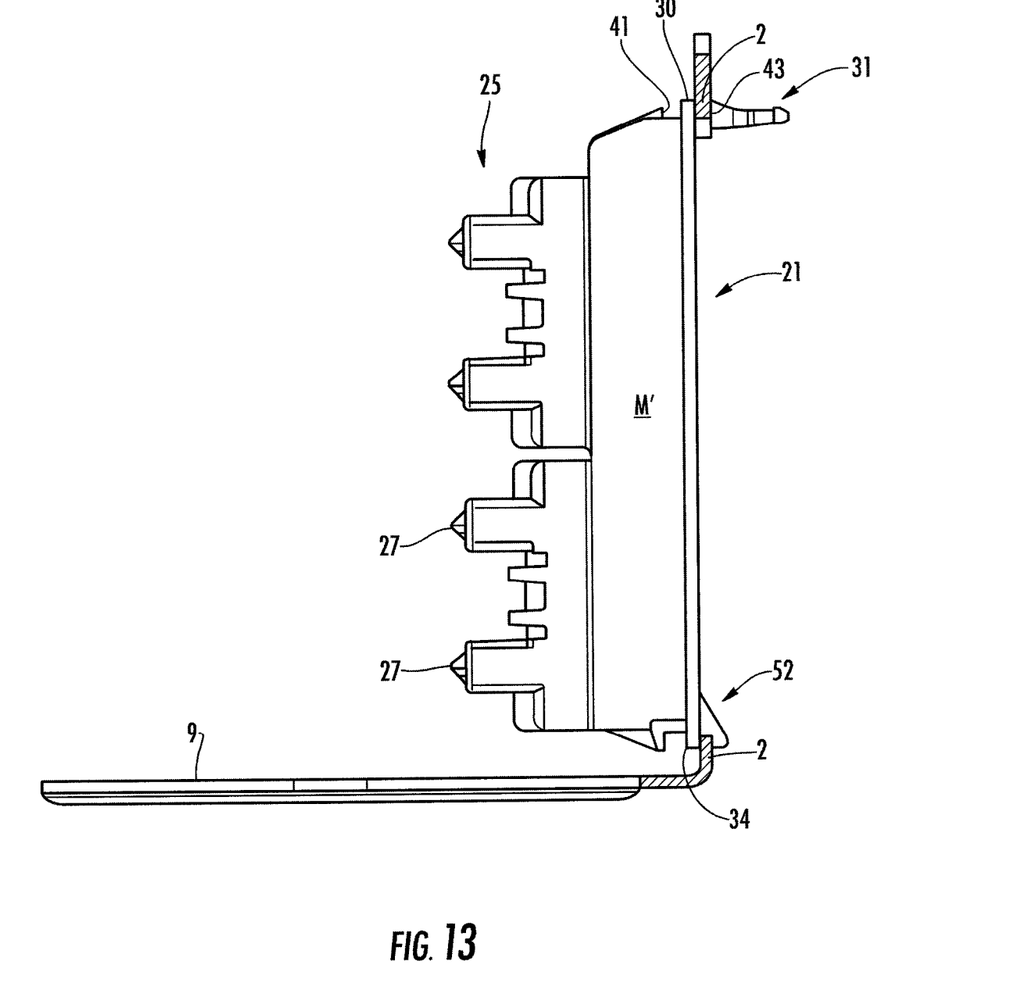
FIG. 13 is a cross sectional view taken along line XIII-XIII in FIG. 12.

Next, the modified module M' is pivoted toward the modified patch panel frame 1' until the upper perimeter edge 2 is snap-captured between the second stop surface 43 and the front of the first face 21 (i.e., in the space designated by the distance D2) as each of the upper resilient tabs 29 and 31 pivots downwardly toward the modified module M' to snap past the perimeter edge 2. This arrangement is illustrated in FIGS. 12 and 13.

To release the modified module M' from the opening 3 of the modified patch panel frame 1', the user applies a downward pressure to the upper tabs 29 and 31, which causes the upper tabs 29 and 31 to move in the direction of arrow A in the FIG. 6, e.g., toward the modified module M'. Once the first or second stop surfaces 41 or 43 are disengaged from the upper perimeter edge 2 of the opening 3, the modified module M' will be free to pivot away from the modified patch panel frame 1' (FIGS. 8 and 11) to be removed from the modified patch panel frame 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A module for a patch panel comprising:
    a front face with a plurality of ports;
    a rear face with a plurality of connectors; and
    at least one resilient tab which permits said module to be snapped into an opening in a patch panel with said front face facing a user then removed from the opening in the patch panel from the front of the patch panel, rotated one hundred eighty degrees and snapped back into the opening in the patch panel from the front of the patch panel, with said rear face facing the user while cords remain attached to said connectors, wherein said at least one resilient tab includes a first, forward facing stop surface and a second, rearward facing stop surface, and wherein a first distance between a rear of said front face and said first stop surface is equal to a second distance between a front of said front face and said second stop surface.

2. The module according to claim 1, wherein said plurality of ports include RJ-type ports, and wherein said plurality of connectors include insulation displacement connectors.

3. The module according to claim 1, wherein said plurality of ports includes a first row of six ports and said module is dimensioned to fit a 1 U patch panel opening height, or wherein said plurality of ports includes a first row of six ports and a second row of six ports and said module is dimensioned to fit a 2 U patch panel opening height.

4. A patch panel system comprising:
    a patch panel frame having an opening formed in a front face thereof, wherein said opening is defined by a perimeter edge; and
    a module removably attached within said opening, said module including:
        a plurality of port receptacles formed therein, wherein said plurality of port receptacles pass through said module from a first face of said module to a second, opposite face of said module, wherein each of said plurality of port receptacles is dimensioned to accept a port and hold the port with a first side of the port located proximate said first face of said module and a second, opposite side of the port located proximate said second, opposite face of said module; and
        at least one movable member attached to said module, wherein said at least one movable member permits said module to be attached within said opening in said patch panel frame with said first face of said module being located proximate said front face of said patch panel frame then removed from said opening in said patch panel frame, rotated one hundred eighty degrees and snapped back into said opening in said patch panel frame with said second face of said module being located proximate said front face of said patch panel frame, and wherein said at least one movable member includes a first, forward facing stop surface and a second, rearward facing stop surface, wherein a space between said rear of said first face and said first stop surface captures said perimeter edge of said opening when said first face of said module is located proximate said front face of said patch panel frame, and wherein a space between said front of said first face and said second stop surface captures said perimeter edge of said opening when said second face of said module is located proximate said front face of said patch panel frame.

5. The patch panel system according to claim 4, wherein said patch panel frame is approximately 19 inches in width and approximately a multiple of 1.75 inches in height.

6. The patch panel system according to claim 4, wherein said opening of said patch panel frame has a first width and said module has a second width, and wherein the first width is substantially equally to or greater than twice the second width.

7. The patch panel system according to claim 6, wherein the first width is substantially equal to or greater than four times the second width.

8. The patch panel system according to claim 4, wherein said patch panel frame includes first and second side flanges, a first through hole being formed in said first side flange and the a second through hole being formed in said second side flange, and further comprising:
a first rack rail and a second rack rail;
a first fastener passing through said first through hole and being secured to said first rack rail; and
a second fastener passing through said second through hole and being secured to said second rack rail.

9. The patch panel system according to claim 4, wherein said opening of said patch panel frame is a first opening, and further comprising:
a second opening formed in said front face of said patch panel frame, wherein said first opening of said patch panel frame has a first width, wherein said module has a second width, wherein said second opening of said patch panel frame has a third width, wherein the first width is substantially equally to or greater than twice the second width, and wherein the third width is substantially equally to the first width.

10. The patch panel system according to claim 4, wherein said at least one movable member includes first and second resilient tabs located proximate an upper edge of said module.

11. A module for a patch panel system comprising:
a plurality of port receptacles formed therein, wherein said plurality of port receptacles pass through said module from a first face of said module to a second, opposite face of said module, wherein each of said plurality of port receptacles is dimensioned to accept a port and hold the port with a first side of the port located proximate said first face of said module and a second, opposite side of the port located proximate said second, opposite face of said module; and
at least one movable member attached to said module, wherein said at least one movable member permits said module to be removably attached within an opening in a patch panel frame with a rear of said first face of said module abutting a perimeter of the opening in the patch panel frame with said first face of said module facing a user, and wherein when said module is removed from the opening in the patch panel frame, said module may be rotated one hundred eighty degrees about an axis and said at least one movable member then permits said module to be removably attached within the opening in the patch panel frame with a front of said first face of said module abutting the perimeter of the opening of the patch panel frame with said second face of said module facing the user,
wherein said at least one movable member includes a first, forward facing stop surface and a second, rearward facing stop surface, and wherein a first distance between said rear of said first face and said first stop surface is equal to a second distance between said front of said first face and said second stop surface.

12. The module according to claim 11, wherein said at least one movable member permits said module to be snapped into attachment within the opening in the patch panel frame.

13. The module according to claim 11, wherein said at least one movable member includes first and second resilient tabs located proximate an upper edge of said module.

14. The module according to claim 11, further comprising:
a plurality of ports respectively residing within said plurality of port receptacles.

15. The module according to claim 14, wherein each port of said plurality of ports is an RJ-type port having an opening to receive a plug at its first side and insulation displacement contacts at its second, opposite side.

16. The module according to claim 11, wherein said plurality of port receptacles includes a first row of six port receptacles, and wherein said module is dimensioned to fit a 1 U patch panel opening height.

17. The module according to claim 11, wherein said plurality of port receptacles includes a first row of six port receptacles and a second row of six port receptacles, disposed below said first row of port receptacles, and wherein said module is dimensioned to fit a 2 U patch panel opening height.

\* \* \* \* \*